UNITED STATES PATENT OFFICE.

ELIS OLSSON, OF WESTPOINT, VIRGINIA.

MANUFACTURE OF SULFATE PULP.

1,375,759.   Specification of Letters Patent.   Patented Apr. 26, 1921.

No Drawing.   Application filed April 2, 1919.  Serial No. 286,938.

*To all whom it may concern:*

Be it known that I, ELIS OLSSON, resident of Westpoint, in the State of Virginia, United States of America, have invented certain new and useful Improvements in the Manufacture of Sulfate Pulp; and I do hereby declare that the following is a full, clear and exact description thereof.

As indicated by the title my invention relates to the cooking of the wood in the manufacture of sulfate pulp, its object being to increase the yield of pulp from a given quantity of wood. To this end the invention consists in increasing the percentage of sulfid of sodium in the cooking liquor thus making it the predominant solvent of the liquor and thereby increasing the percentage of a solvent which does not attack the cellulose to the same extent as the previously predominating solvent. The advantageous result being that a higher yield of pulp is obtained.

It may be explained that the weak liquor resulting from washing sulfate pulp and which is known as "black liquor" is treated in a special process for the purpose of recovering the chemicals essential to the manufacture of sulfate pulp and which would otherwise be lost. This black liquor consists mainly of sodium carbonate, lignate of sodium, water and organic matter. This liquor is evaporated as the recovering process is carried on. The final evaporation takes place while the mass is in a rotary furnace from which the evaporated liquor in a thick or semi-dry condition is discharged. This discharged substance is known as "black ash" and it is burned in a smelting furnace and the gases given off are collected for subsequent use.

Heretofore the losses made during this recovering process and in the preceding pulp manufacturing process were compensated for by mixing with the black ash the chemical substance known as "salt-cake" which was introduced into the smelting furnace where it was mixed with the black ash. The cake is sulfate of soda which was reduced to sulfid of soda by the chemical action of the organic substance in the black ash. The sulfid of sodium is one of the main solvents in the cooking of the pulp, its purpose being to produce a clean, long fiber pulp. I have discovered, however, that the yield of this process was not as great nor the fibers as strong as should be obtained. This defect is due to the fact that the old process provided for the addition of the salt cake to the black ash in the smelting furnace with the result that a relatively small amount of sulfid of soda was produced by this recovering process because no radical change was made in the recovered chemicals, the entire chemical action having taken place between the salt cake and the residue. To overcome this deficiency and provide a more efficient recovering process is the object of an invention covered by me in my application for United States Patent filed August 16, 1918, under Serial No. 250194.

A radical change in the recovered chemicals is secured by adding to the black liquor what is known to the trade as "niter-cake" which consists of from 60% to 65% sulfate of soda and about 30% sulfuric acid. By adding this niter-cake to the black liquor, part of the carbonate of soda of the black liquor is converted into sulfate of soda by the free acid in the niter-cake thereby developing a high percentage of this essential ingredient in the production of sulfid of soda from the black ash.

The black ash obtained from this mixture contains no sulfuric acid, the sulfate of soda however, thoroughly permeates the black ash thereby rendering it capable of being more completely reduced. When using niter-cake which, as before mentioned, has the chemical formula $NaHSO_4$, a greater percentage of sulfid of sodium is obtained than is possible with salt cake which has the chemical formula $NaSO_4$. Sulfid of sodium is an agent that acts as a mild solvent on the binding substances in the wood but does not attack the cellulose to the extent that the latter is attacked by hydrate of sodium, the other main solvent in the cooking liquor. In other words, by using my process, hydrate of sodium is replaced to such an extent that the sulfid of sodium becomes the predominant solvent in the cooking liquor, and this high percentage of sulfid of sodium causes higher yield of pulp than obtained with the sulfate process as heretofore practised.

The improved recovering process herein disclosed is not claimed as it forms the subject-matter of the separate application above identified.

What I claim is as follows:

1. In the manufacture of sulfate pulp a cooking liquor including sodium hydrate and sodium sulfid, the sodium sulfid being the predominant solvent.

2. In the manufacture of sulfate pulp acting upon the black liquor obtained from a preceding operation for the purpose of obtaining a cooking liquor for use in a subsequent operation in which the proportion of sodium sulfid is relatively greater than the sodium hydrate.

3. In the manufacture of sulfate pulp acting upon the black liquor obtained from a preceding operation in such a manner as to make a portion of the alkaline salts of sodium found therein available for conversion ultimately into sodium sulfid for the purpose of making sodium sulfid the predominant solvent in the cooking liquor for use in a subsequent operation.

In testimony whereof I have signed my name to this specification in the presence of two witnesses.

ELIS OLSSON.

Witnesses:
C. A. WALKER,
C. F. POWERS.